United States Patent [19]
Harada et al.

[11] Patent Number: 5,500,043
[45] Date of Patent: Mar. 19, 1996

[54] LUSTROUS PIGMENT AND THE METHOD OF PRODUCING THE SAME

[75] Inventors: Hidefumi Harada; Takanori Yamasaki; Eizi Sadanaga; Teruyoshi Okazaki, all of Yamaguchi, Japan

[73] Assignee: Titan Kogyo Kabushiki Kaisha, Yamaguchi, Japan

[21] Appl. No.: 487,973

[22] Filed: Jun. 7, 1995

Related U.S. Application Data

[63] Continuation of Ser. No. 166,627, Dec. 15, 1993, abandoned.

[30] Foreign Application Priority Data

Dec. 17, 1992 [JP] Japan ............................. 4-337380

[51] Int. Cl.$^6$ ................................................ C09C 1/22
[52] U.S. Cl. .......................... 106/456; 106/415; 106/455; 106/459; 427/218
[58] Field of Search .................................. 106/415, 455, 106/459, 456; 427/28

[56] References Cited

U.S. PATENT DOCUMENTS

| | | | |
|---|---|---|---|
| 4,373,963 | 2/1983 | Uenishi et al. | 106/415 |
| 4,374,677 | 2/1983 | Senda et al. | 106/459 |
| 4,376,656 | 3/1983 | Senda et al. | 106/415 |
| 4,404,254 | 9/1983 | Franz et al. | 428/329 |
| 4,780,140 | 10/1988 | Franz et al. | 106/20 |
| 4,826,537 | 5/1989 | Ostertag | 106/459 |

FOREIGN PATENT DOCUMENTS

| | | |
|---|---|---|
| 0014382 | 8/1980 | European Pat. Off. . |
| 0068311 | 1/1983 | European Pat. Off. . |
| 2508932 | 9/1976 | Germany . |

OTHER PUBLICATIONS

Database WPI, Week 904, Derwent Publications Ltd., London, GB; AN 90–026289 & JP-A-1 304 160 (Toda Kogyo), 7 Dec. 1989.

Abstract of JP-A-80104923, Aug. 1980.

*Primary Examiner*—Mark L. Bell
*Assistant Examiner*—Scott L. Hertzog
*Attorney, Agent, or Firm*—Cushman Darby & Cushman

[57] ABSTRACT

The object of the present invention is to provide a lustrous pigment free from the defects of conventional platelike or flaky iron oxide pigments that a mechanical strength is poor, adjustable colors are restricted and that a pigment lustrous is weak even if colors can adjusted variously and a method of producing the same. The present invention relates to a flaky iron oxide lustrous pigment having a hematite structure characterized by containing at least one of the elements selected from Zn, Sb and Sn and Al in solid solution and its platelike crystal having an average thickness of 0.8 μm or more, preferably the content of at least one of the elements selected from Zn, Sb and Sn being in the range of 0.05 to 0.5 weight % as oxides and the content of Al being in the range of 0.5 to 3 weight % as $Al_2O_3$.

4 Claims, No Drawings

LUSTROUS PIGMENT AND THE METHOD OF PRODUCING THE SAME

This is a continuation of application Ser. No. 08/166,627, filed on Dec. 15, 1993, abandoned.

BACKGROUND OF THE INVENTION

The present invention relates to a lustrous flaky iron oxide pigment and a method of producing the same. The pigment has a broad range of application including paints, synthetic resins, cosmetics, ink, synthetic leather and wallpaper.

Conventionally, as lustrous iron oxide pigments, a mica-like or platelike iron oxide (hereinafter abbreviated to "MIO") and a flaky red iron oxide containing aluminum in solid solution have been known. MIO exhibits a blackish-purple color and intense metallic luster (see Japanese Patent Publication (KOKOKU) No. 12435/68). However, a problem exist in that its platelike crystal structure is broken readily during dispersion into a paint or resin because of its poor mechanical strength. As a result, its color changes greatly during dispersion and it is hard to control the resulting color of a paint or a resin. A flaky red iron oxide containing aluminum in solid solution has a $Al_xFe_{2-x}O_3$ hematite structure and is characterized in having an intense lustrous and opacifying properties. Since the thickness of its crystal is 0.7 μm or less, it exhibits a red color (see Japanese Patent Publication (KOKOKU) No. 8977/85). The red iron oxide has a high mechanical strength, accordingly its platelike crystal is resistant to breakage during dispersion into a paint or resin. As a result, any change in color is small and it is easy to control the resulting color of a paint or resin. However, because of its red color, the range of adjustable colors is restricted even if other pigments are incorporated. In addition, the flaky red iron oxide containing aluminum in solid solution is characterized by having thin crystals and there has never been synthesized a crystal having an average thickness greater than 0.8 μm.

Japanese Patent Public Disclosure (KOKAI) No. 104923/80 discloses a platelike iron oxide pigment containing 0.1 to 12 weight % of at least one of the oxides of the elements belonging to Group IV, Group V and/or Group VI and/or Group B and/or Group IIB according to the periodic table. Said pigment is a mixture of an iron oxide particle and a compound of said elements and is characterized in that a hematite particle contained in said pigment has thin-plate shape of a thickness of 0.6 μm or less and its color is red to red yellow. Hence, this pigment also gives rise to the problem that the range of adjustable colors are restricted.

Japanese Patent Publication (KOKOKU) No. 21976/86 discloses an improved flaky red iron oxide containing aluminum in solid solution of which surface is coated with titanium dioxide hydrate or titanium dioxide. Said pigment can be subjected to various color changes upon controlling the thickness of a titanium dioxide hydrate layer or a titanium dioxide layer on the surface of the flaky red iron oxide containing aluminum in solid solution particles. However, it suffers from a defect in that its lustrousness, an essential characteristic as a lustrous pigment, is poor in comparison with that of a red iron oxide containing aluminum in solid solution.

Japanese Patent Public Disclosure (KOKAI) No. 317559/88 discloses that colors of a pigment can be controlled variously from a copper color to a black by forming a spinel phase on the surface layer of said pigment with a reduction of the surface of a red iron oxide containing aluminum in solid solution. However, a pigment obtained by this method gives rise to problems in that its lustrous character is weak in comparison with that of a red iron oxide containing aluminum in solid solution. Furthermore, the change of color during dispersion is large, since its mechanical strength is small and its platelike crystal is readily broken during dispersion.

U.S. Pat. No. 4,826,537 discloses a pigment based on an iron oxide of the general formula $Mn_xAl_yFe_{2-(x+y)}O_3$. The color of the pigment changes depending on the diameter of the particle. It is described that the pigment has a reddish yellow color at 10 μm in diameter and which shifts toward violet with increasing diameter. However, the pigment shows violet color when its diameter becomes larger than 50 μm. Such a large pigment is readily broken during dispersion and it is hard to control the resulting color of a paint or a resin.

SUMMARY OF THE INVENTION

The object of the present invention is to provide a lustrous pigment having no defects of conventional platelike or flaky iron oxide pigments and a method of producing the same.

DETAILED DESCRIPTION OF THE INVENTION

The present invention provides a lustrous flaky iron oxide pigment having a hematite structure characterized by containing aluminum and at least one of the elements selected from Zn, Sb and Sn in solid solution and thicker than 0.8 μm, preferably than 1.0 μm, in an average thickness. Preferably, the pigment contains 0.05 to 0.5 weight % of said element as oxides thereof and contains 0.5 to 3 weight % of Al as $Al_2O_3$.

Furthermore, the present invention provides a process for preparing said pigment comprising steps of dispersing an iron oxyhydroxide and at least one of salts or oxides of an element selected from Zn, Sb and Sn into an aqueous aluminate solution and subjecting the resultant solution to a hydrothermal treatment at above 250° C. or steps of dispersing a ferric colloidal precipitate obtained by adding an alkali into an aqueous solution of ferric salt and at least one of the salts or oxides of an element selected from Zn, Sb and Sn into an aqueous aluminate solution and subjecting the resultant solution to a hydrothermal treatment at above 150° C.

Aluminum and said elements selected from Zn, Sb and Sn mainly exist on crystal lattices.

The lustrous pigment of the present invention has advantageous effects in that a color of the lustrous pigment can be adjusted optionally from red to black and an intense metallic luster is obtained. Furthermore, since the pigment has good mechanical strength, thee change of a color during dispersion is small and hence it is easy to control the resulting colors of paints and resins.

When an average diameter is less than 10 μm, a lustrous becomes weak. And when an average diameter is larger than 20 μm, the change of color during dispersion becomes greater.

A prior flaky iron oxide having an average thickness larger than 0.8 μm contains a large amount of penetration twin and is readily broken during dispersion. On the other hand, the flaky iron oxide of the present invention does not contain penetration twin substantially, accordingly it is resistant to breakage during dispersion.

It is preferable to keep the average thickness of the flaky iron oxide less than 3 μm, because thick particles are apt to contain penetration twin.

The lustrous pigment of the present invention can be produced by the process comprising steps of dispersing iron oxyhydroxide and at least one salts or oxides of an element selected from Zn, Sb and Sn into an aqueous solution of aluminate, subjecting the resultant solution to a hydrothermal treatment at a temperature of more than 250° C. The Lustrous pigment of the present invention can be produced also by the process comprising a step of subjecting a ferric colloidal precipitate obtained by adding alkali into an aqueous solution of ferric salt and at least one of salts or oxides of an element selected from Zn, Sb and Sn to a hydrothermal treatment in an aqueous solution of aluminate at a temperature of more than 150° C. Specifically, for example, α-iron oxyhydroxide (α-FeOOH) and an oxide of an element selected from Zn, Sb and Sn are dispersed into an aqueous solution of sodium aluminate and the resultant product is put into an autoclave and heated to a temperature of 250° C. or more; thereby the whole oxide of an element selected from Zn, Sb and Sn is dissolved in the aqueous solution of aluminate during the heating. When the temperature of the solution becomes above 250° C., α-iron oxyhydroxide is decomposed as $260\text{-FeOOH} \rightarrow \alpha\text{-Fe}_2\text{O}_3 + \text{H}_2\text{O}$ to crystallize out MIO ($\alpha\text{-Fe}_2\text{O}_3$). During the crystallization, an ion of said added metal and an aluminum ion in the solution are taken into the crystal lattices thereby a flaky iron oxide pigment having a hematite structure characterized in that it contains at least one of the elements selected from Zn, Sb and Sn and Al in solid solution and its platelike crystal has an average thickness of 0.8 μm or more is formed.

The aqueous aluminate solution used as the mother liquid for the hydrothermal treatment in the above process can be prepared by dissolving an aluminate salt in water or aqueous alkaline solution, however the aqueous aluminate solution may also be prepared from other aluminum compounds. Specifically, a) those aluminum compounds such as aluminum chloride, aluminum sulfate and aluminum nitrate, whose aqueous solutions exhibit acidic nature, may be dispersed first in water and then used after adjusting the pH value of the aqueous solution to greater than 10 by the addition of an alkaline agent. Since, aluminum is considered to be present as aluminate ions aqueous solution of pH value greater than 10 ("Qualitative Analytical Chemistry II", written by G. Charlot, translated by Kozo Sekine and Genji Tanaka, published by Kyoritsu Shuppan K.K. in 1974), the aqueous aluminate solution is prepared by the above procedures. b) In the case of using metallic aluminum, aluminum trioxide and the like, these are dissolved in strong acid or strong alkali. They are applied with the same procedures as shown in a) above when dissolved into the strong acid, or used as they are when dissolved into the strong alkali. In each case, the solution is adjusted to an appropriate concentration.

A ratio of a concentration of $Al_2O_3$ and an alkali concentration in an aqueous aluminate solution is important. When the alkali concentration is too high relative to the concentration of $Al_2O_3$, a ratio of aluminum dissolved into a MIO crystal decreases and hence the product becomes similar to MIO, accordingly the mechanical strength becomes low. On the other hand, when the alkali concentration is too low relative to the concentration of $Al_2O_3$, it is hard to obtain a platelike product having more than 0.8 μm in thickness. In case of using sodium aluminate as aluminate, a preferable ratio of a concentration of NaOH (g/liter) to a concentration of $Al_2O_3$ (g/liter) is 2 to 5.

A preferable concentration of $Al_2O_3$ in an aqueous aluminate solution is in the range of 5 to 70 g/liter. That is, in case of a concentration of less than 5 g/liter, an average particle diameter of a product becomes less than 5 μm and its luster becomes poor. Besides, in case that said concentration of $Al_2O_3$ is larger than 70 g/liter, the aluminum content in a product becomes more than 3% and hence it becomes hard to obtain a platelike product having a thickness of more than 0.8 μm.

When a salt or an oxide of an element selected from Zn, Sb and Sn is dispersed into an aqueous solution of alkali metal aluminate and heated in an autoclave, Zn, Sb and Sn are dissolved as a zincic acid ion, an antimonic acid ion and a stannic acid ion, respectively. The amounts of these metals to be added vary according to the concentration, composition and kind of alkali metal aluminate. When sodium aluminate of the above composition and concentration range is used, it is preferable to use the metals as oxides thereof from 1 to 15 weight % on the basis of the weight of $Al_2O_3$ which is obtainable from an aluminum contained in an aqueous aluminate solution.

Zn, Sb and Sn can be used in any forms of oxides, hydroxides, sulfates, carbonates, chlorides, nitrates and alkali salts. It is important that these elements exist as ions thereof in an aqueous aluminate solution when the lustrous pigment of the present invention having a hematite structure is formed in a hot aqueous solution. That is, when said elements exist as a solid, the thickness of iron oxide crystals to be formed becomes thin and a product having a thickness of more than 0.8 μm is hard to obtain.

The existence of zinc in iron oxyhydroxide as an impurity is undesirable, because such a zinc inhibits growth of the flaky iron oxide and makes it difficult to grow it to greater than 10 μm in average diameter. A preferable content of zinc as ZnO is less than 0.24.

In case of iron oxyhydroxide is used as an iron source, the concentrations of a slurry at the time of a hydrothermal treatment vary according to the kinds and particle size of iron oxyhydroxide. However, in many cases, 200 g/liter or less is preferable. 150 g/liter or less is preferable to obtain a product having a large and uniform particle size.

The lustrous pigment of the present invention is an iron oxide pigment having a hematite structure. Hence, a streak color is red. The colors can be changed from red to black in accordance with the synthesis conditions. A pulverized powder exhibits colors of red to dark red.

Hereunder, the present invention will be described in more detail according to Examples. The following Examples are mentioned only for exemplification, and the present invention is not restricted by them in any way.

EXAMPLE 1

110 g of a commercially available yellow iron oxide (α-FeOOH: TAROX LL-XLO) and 2 g of zinc oxide were dispersed into 1000 ml of an aqueous solution of sodium aluminate containing $Al_2O_3$ of 35 g/liter and NaOH of 120 g/liter, and the resultant solution was put into a nickel-lined autoclave, heated to 300° C. by 3 hours under stirring at 350 rpm and kept for 20 minutes.

After being allowed to cool, the contents were removed from the autoclave, washed with water until the electrical conductance of the filtrates decreased below 100 μS/cm or less and dried.

This product had a black color with an intense luster. The average diameter in a plate direction was 15 μm. The average thickness of the crystals determined by ultra-microtomy was about 3 μm.

The chemical analysis gave 0.84 $Al_2O_3$ and 0.24 of ZnO. Analysis with an analytical electron microscope and a scanning electron microscope confirmed that Al and Zn were distributed uniformly in particles and the surface of platelike particles was smooth and no particle existed other than hematite. Furthermore, x-ray powder diffraction confirmed that there was no phase except that of the compound having a hematite structure.

COMPARATIVE EXAMPLE 1

110 g of the same commercially available yellow iron oxide as used in Example 1 were dispersed into 1000 ml of an aqueous solution of sodium aluminate containing $Al_2O_3$ of 35 g/liter and NaOH of 120 g/liter, and the resultant solution was put into an nickel-lined autoclave, heated to 300° C. by 3 hours under stirring at 350 rpm and kept for 20 minutes. After being allowed to cool, the contents were removed from the autoclave, washed with water until the electrical conductance of the filtrate decreased below 100 μS/cm and dried.

This product had a red color and an intense luster. The average diameter in a plate direction was 13 μm. The average thickness of the crystals determined by ultra-microtomy was about 0.4 μm.

X-ray powder diffraction confirmed that there was no phase except that of the compound having a hematite structure and the chemical analysis gave 0.9% $Al_2O_3$.

EXAMPLE 2

The same procedure as in Example 1 was repeated except that an aqueous solution of sodium aluminate had an $Al_2O_3$ concentration of 45 g/liter and an NaOH concentration of 130 g/liter and that the amount of zinc oxide to be added was varied variously in the range of 0.1 to 7 g. The results of the experiment are shown in Table 1.

TABLE 1

| Zinc Oxide Amount added (g) | Amount of ZnO in products (%) | Amount of $Al_2O_3$ in products (%) | Average particle diameter (μm) | Average thickness (μm) |
| --- | --- | --- | --- | --- |
| 0.1 | <0.00 | 1.1 | 12 | 0.4 |
| 0.5 | 0.02 | 1.1 | 12 | 0.7 |
| 0.7 | 0.05 | 1.0 | 13 | 1.2 |
| 1.0 | 0.09 | 0.9 | 14 | 2.1 |
| 2.0 | 0.25 | 0.8 | 14 | 2.8 |
| 3.0 | 0.50 | 0.8 | 11 | 0.8 |
| 6.0 | 1.08 | 1.3 | 7 | 0.3 |
| 7.0 | 1.25 | 1.5 | 5 | 0.2 |

EXAMPLE 3

70 g of a commercially available yellow iron oxide (α-FeOOH: TAROX LL-XLO) and 4 g of antimony oxide were dispersed into 1000 ml of an aqueous solution of sodium aluminate containing $Al_2O_3$ of 40 g/liter and NaOH of 120 g/liter, and the resultant solution was put into a nickel-lined autoclave, heated to 280° C. by 1 hours under stirring at 350 rpm and kept for 30 minutes. After being allowed to cool, the contents were removed from the autoclave, washed with water until the electrical conductance of the filtrates decreased to below 100 μS/cm or less and dried.

This product had a blackish-purple color with an intense luster. The average diameter in a plate direction was 13 μm. The average thickness of the crystals determined by ultra-microtomy was about 1.5 μm.

The chemical analysis gave 1.2% and $Al_2O_3$ and 0.3% of $Sb_2O_3$. Analysis with an analytical electron microscope and a scanning electron microscope confirmed that Al and Sb were distributed uniformly in particles and the surface of platelike particles was smooth and no particles existed other than hematite. Furthermore, x-ray powder diffraction confirmed that there was no phase except that of the compound having a hematite structure.

COMPARATIVE EXAMPLE 2

70 g of a commercially available yellow iron oxide (α-FeOOH: TAROX LL-XLO) were dispersed into 1000 ml of an aqueous solution of sodium aluminate containing $Al_2O_3$ of 40 g/liter and NaOH of 120 g/liter, and the resultant solution was put into an nickel-lined autoclave, heated to 280° C. by 1 hour under stirring at 350 rpm and kept for 30 minutes. After being allowed to cool, the contents were removed from the autoclave, washed with water until the electrical conductance of the filtrate decreased to below 100 μS/cm and dried.

This product had a red color and an intense luster. The average diameter in a plate direction was 17 μm. The average thickness of the crystals determined by ultra-microtomy was about 0.4 μm.

X-ray powder diffraction confirmed that there is no phase except that of the compound having a hematite structure. The chemical analysis gave 1.14 $Al_2O_3$.

EXAMPLE 4

70 g of yellow iron oxide obtained by a conventional method, that is air-oxiding an aqueous solution of ferrous sulfate while adding an alkali, filtering the obtained 21 m²/g Of yellow iron oxide, washing and drying at 110° C., and 3 g of tin oxide were dispersed into 1000 ml of an aqueous solution of sodium aluminate containing $Al_2O_3$ of 20 g/liter and NaOH of 60 g/liter, and the resultant solution was put into nickel-lined autoclave, heated to 330° C. by 2 hours under stirring at 250 rpm and kept for 10 minutes. After being allowed to cool, the contents were removed from the autoclave, washed with water until the electrical conductance of the filtrates decreased to below 100 μS/cm or less and dried.

This product had a dark brown color with an intense luster. The average diameter in a plate direction was 18 μm. The average thickness of the crystals determined by ultra-microtomy was about 2 μm.

The chemical analysis gave 1.3% and $Al_2O_3$ and 0.3% of $SnO_2$. Analysis with an analytical electron microscope and a scanning electron microscope confirmed that Al and Sn were distributed uniformly in particles and the surface of platelike particles was smooth and no existence of particles other than hematite. Furthermore, x-ray powder diffraction confirmed that there was no phase except that of the compound having a hematite structure.

COMPARATIVE EXAMPLE 3

70 g of yellow iron oxide used in Example 4 were dispersed into 1000 ml of an aqueous solution of sodium aluminate containing $Al_2O_3$ of 20 g/liter and NaOH of 60 g/liter, and the resultant solution was put into nickel-lined autoclave, heated to 330° C. by 2 hours under stirring at 250 rpm and kept for 10 minutes. After being allowed to cool, the contents were removed from the autoclave, washed with water until the electrical conductance of the filtrates decreased to below 100 µS/cm or less and dried.

This product had a red color with an intense luster. The average diameter in a plate direction was 20 µm. The average thickness of the crystals determined by ultra-microtomy was about 0.5 µm.

The chemical analysis gave 1.34 $Al_2O_3$. X-ray powder diffraction confirmed that there was no phase except that of the compound having a hematite structure.

EXAMPLE 5

Into 250 ml of an aqueous solution of ferric sulfate containing $Fe_2(SO_4)_3$ of 375 g/liter was added an aqueous solution of sodium hydroxide of 350 g/liter until the pH became 13, after that 3 g of zinc oxide and 1 g of antimony oxide were added thereinto, and further 240 ml of an aqueous solution of sodium aluminate containing $Al_2O_3$ of 70 g/liter and NaOH of 320 g/liter were added into the solution, and the resultant solution was put into nickel-lined autoclave, heated to 270° C. by 1 hour under stirring at 260 rpm and kept for 2 hours. After being allowed to cool, the contents were removed from the autoclave, washed with water until the electrical conductance of the filtrates decreased to below 100 µS/cm or less and dried.

This product had a dark green color with an intense luster. The average diameter in a plate direction was 8 µm. The average thickness of the crystals determined by ultra-microtomy was about 1.5 µm.

The chemical analysis gave 1.5% $Al_2O_3$, 0.2% ZnO and 0.14 $Sb_2O_3$. Analysis with an analytical electron microscope and a scanning electron microscope confirmed that Al, Zn and Sb were distributed uniformly in particles and the surface of platelike particles was smooth and no particles existed other than hematite. Furthermore, x-ray powder diffraction confirmed that there was no phase except that of the compound having a hematite structure.

What is claimed is:

1. A lustrous flaky iron oxide pigment having a hematite structure characterized in that said pigment contains aluminum and at least one of the elements selected from Zn, Sb and Sn in solid solution and is thicker than 0.8 µm in an average thickness.

2. The pigment according to claim 1 characterized in that said pigment contains 0.05 to 0.5 weight % of at least one of the elements selected from Zn, Sb and Sn as oxides thereof and 0.5 to 3 weight % of aluminum as $Al_2O_3$.

3. A method of producing the pigment of claim 1 comprising steps of dispersing an iron oxyhydroxide and at least one of salts or oxides of an element selected from Zn, Sb and Sn into an aqueous aluminate solution and subjecting the resultant solution to a hydrothermal treatment at above 250° C.

4. A method of producing the pigment of claim 1 comprising steps of dispersing a ferric colloidal precipitate obtained by adding an alkali into an aqueous solution of ferric salt and at least one of salts or oxides of an element selected from Zn, Sb and Sn into an aqueous aluminate solution and subjecting the resultant solution to a hydrothermal treatment at above 150° C.

* * * * *